United States Patent
Gleason

[15] 3,694,620
[45] Sept. 26, 1972

[54] DUAL WELDING WIRE FEED FOR ARC WELDER

[72] Inventor: William R. Gleason, 204 S. Wilson Ave., Covina, Calif. 91722

[22] Filed: Dec. 10, 1970

[21] Appl. No.: 96,959

[52] U.S. Cl. ................219/130, 219/136, 226/110
[51] Int. Cl. .............................................B23k 9/00
[58] Field of Search........219/131, 137, 130, 136, 76, 219/74; 226/110; 314/51, 52, 53, 54, 69

[56] References Cited

UNITED STATES PATENTS

| | | | |
|---|---|---|---|
| 2,490,593 | 12/1949 | Kay | 314/5 |
| 2,866,079 | 12/1958 | Morley, Jr. et al. | 219/130 |
| 3,062,950 | 11/1962 | Chyle | 219/127 |
| 3,133,187 | 5/1964 | Anderson | 219/131 |
| 3,529,127 | 9/1970 | Smith | 219/130 |
| 3,546,415 | 12/1970 | Marantz | 219/130 X |

FOREIGN PATENTS OR APPLICATIONS 197,178    4/1958    Austria......................219/130

Primary Examiner—J. V. Truhe
Assistant Examiner—George A. Montanye
Attorney—Forrest J. Lilly

[57] ABSTRACT

This application discloses an electric arc welding system using two welding wires fed through a single torch, with means for driving either wire in either direction. The torch, or torch tip, has a wire passage which, at the extremity of the tip, will pass only one of the two wires. The two wires are threaded through the torch side-by-side, and with one in a retracted position, the other can be fed from the torch. Thus, assuming two wires of different characteristics, a change over from one to the other can be quickly made.

5 Claims, 4 Drawing Figures

PATENTED SEP 26 1972　3,694,620

INVENTOR.
WILLIAM R. GLEASON
BY Forrest J. Lilly
ATTORNEY

DUAL WELDING WIRE FEED FOR ARC WELDER

BACKGROUND OF THE INVENTION

This invention relates generally to arc welding machines of the class utilizing a consumable welding wire fed through an electric contact tube from a supply reel into and through a torch, the arc being struck between the end of the wire and the work.

In many welding jobs, it is desirable to change from time to time from a welding wire which will lay down metal of one degree of hardness to a welding wire which will lay down metal of a different hardness. It has been proposed in the past to use two welding wire reels, one wire feeding device for each, and two torches, one for each. One or the other wire and torch will be fed depending upon which wire feeding means is activated. This practice, however, is somewhat slow and inconvenient, and it is a purpose of the present invention to enable the feeding of one wire or the other from a single torch, with hardly more than an instant of changeover time.

BRIEF SUMMARY OF THE INVENTION

According to the invention, two wire supply sources such as wire reels are provided, and two separate, alternately actuated wire feeding devices, one for each wire. The wires from these devices are fed through two flexible tubes joining the two arms of a Y-fitting or yoke, and thence, side by side, out the leg or stem thereof and through a single tubular electrically conductive housing or sleeve. This sleeve leads to the bore of a single torch, into which both wires can be fed. The torch tip is also bored, but with a bore size at the discharge orifice which can pass only one wire. Thus, there is a reduction in the size of the wire passage, and beyond this reduction there is room for only one of the two wires. The other wire must then be stopped in or retracted to some position in back of the reduction. A reversible drive motor can be switched to drive one or the other of the wire feed devices, and, with the other wire in such a retracted position, can be advanced out through the tip for welding. To weld with the other wire, the first must be retracted by the reversible drive motor to a point rearward of the reduction. Proper switching then drives the other of the two wires past the reduction, and on out through the tip of the torch, while the first, now retracted, stands stationary.

This arrangement affords for the first time the convenient capability of controlling the emission of either wire from the single discharge orifice of the single torch, it requiring only an instant or so to retract a wire of one hardness, project a wire of different hardness, suitable for a changed condition on the work piece, and go on with the welding program.

DESCRIPTION OF A PREFERRED EMBODIMENT

Figure 1:
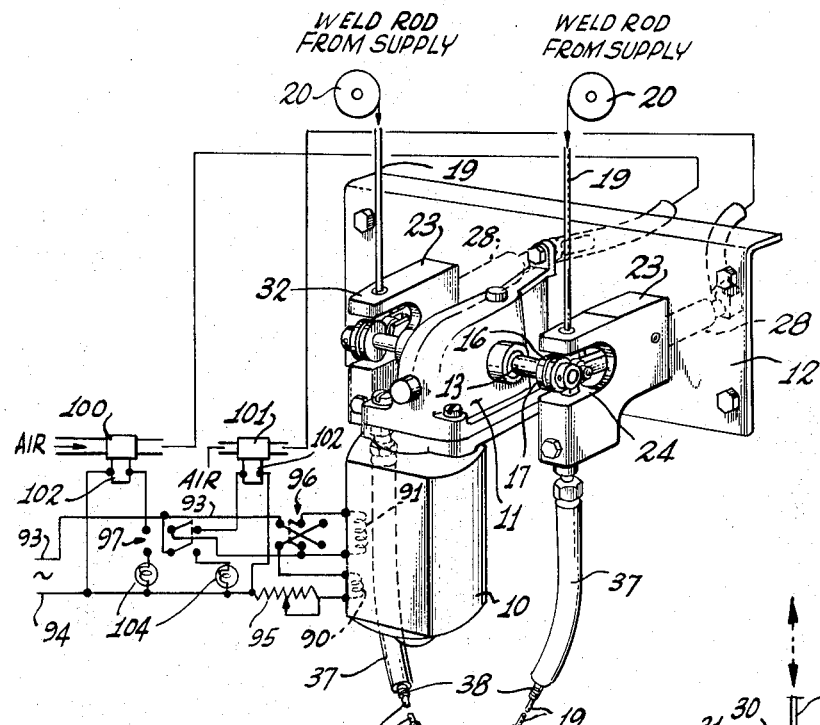
FIG. 1 is a perspective view of a welding system in accordance with the invention.
Figure 2:
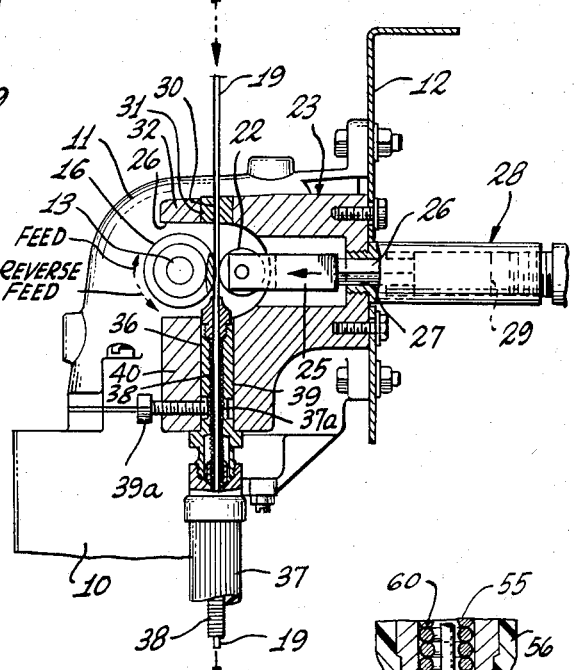
FIG. 2 is a medial sectional view through one of the two wire feeding devices and its housing, at right angles to the motor driven drive shaft for the wire feed roller.
Figure 3:
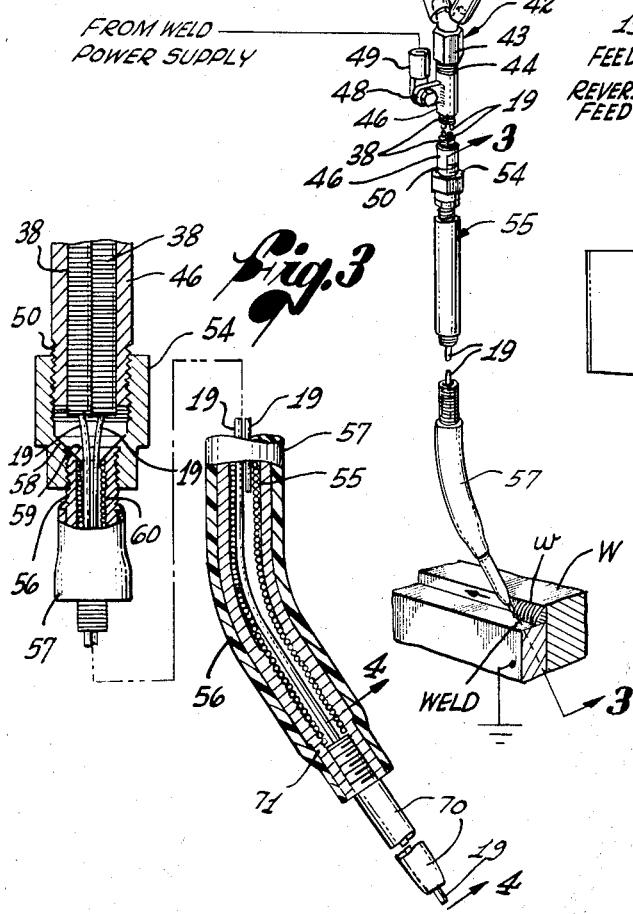
FIG. 3 is a partially broken away section on line 3—3 of FIG. 1.
Figure 4:
FIG. 4 is an enlarged longitudinal section of the welding tip and a portion of the lower end of the torch.

The dual wire feeding device has a vertically disposed motor 10, preferably an A.C. series motor, though a D.C. motor could be used, to which is secured a rear box 11, and the latter is mounted on a vertical frame member or support 12 understood to be fixed to the frame of the welding machine. Motor 10 drives, through reduction gears in box 11, a horizontal shaft 13 whose end portions project oppositely from opposite sides of the gear box. On the ends of shaft 13 are wire drive rollers 16 having peripheral grooves 17 into which the wire can partially be received in order to provide good driving engagement between the roller and wire.

A welding wire 19, fed from a reel diagrammatically indicated at 20, stretches vertically, in tangential relation to each of the rollers 16, and pressure rollers 22 engage the wires from the opposite sides of rollers 16 to hold the wires in driving engagement with the drive rollers 16. The means by which these pressure rollers are pressed against the drive rollers will be described presently. Mounted on support 22, on opposite sides of gear box 11, and projecting outwardly from said support, are mounting blocks 23, each with a deep notch 24 in the projecting end thereof to form a space for the drive and pressure rollers.

Each pressure roller is held by a clevis 25 on a plunger 26, which is of non-circular, preferably hexagonal, cross section, and which is slidably received in hole 27 of similar cross section formed in the threaded neck of an air cylinder 28 screwed into the inner end of block 23. On plunger 26, inside air cylinder 28, is a piston 29 sliding in the interior of cylinder 28, and this piston 29, as well as the interior of the cylinder, may also be of hexagonal cross section if desired. The purpose of the hexagonal cross sectional configurations is to guide the clevis and the pressure roller which it bears against rotation about the axis of the plunger which supports the clevis and pressure roller.

The two welding wires 19, understood to be fed from the two reels, 20 lead downwardly through guide holes 30 in bushings 31 set into the upper housing parts 32 above the notch, stretch downwardly between the drive and pressure rollers, and thence pass through axial passageways in tubular connectors 36 and flexible tubes 37 coupled thereto. These passageways are defined by flexible guide tubes 38 made up of a tightly coiled spring.

Annular grooves 37a encircling the connectors are engageable by screws 39a to releasably hold the connectors in the bores 39 provided for them in the lower housing parts 40, below the notches 36.

The flexible tubes 37, which are preferably rubber, are joined by the two arms of a Y-fitting 42, the leg or body 43 of which is externally hexagonal to afford wrench faces, and the bore of which is internally threaded to receive the externally threaded upper end 44 of a brass or other electrically conductive sleeve 46. This sleeve 46 has a lug 48 at its upper end to which is connected an electric cable 49, and between this lug and the externally threaded lower end 50 of the sleeve 46, said sleeve is encased in an insulation block, not shown, which is supported in any suitable manner from the welding machine frame, as for example in a manner enabling vertical adjustment relative to the welding machine as a whole.

Screwed onto the lower end 50 of the sleeve 46 is a coupling 54 on the upper end of the depending welding torch 55.

The welding wire guides 38 in the two tubes 37 converge and meet at the Y-fitting 42, and extend downwardly therebelow through the brass sleeve 46, side by side, just fitting within the sleeve 46 and making good electrical contact with the inside of the contactor sleeve 46. The guides 38 thus are electrically energized from the cable 46, and the welding wires in the guides are in turn electrically energized from the sleeve 46.

The two guides 38 terminate at the lower end of the contactor sleeve 46, and the welding wires emerge therefrom and are fed, side by side, downwardly into torch 55.

The torch 55 comprises an elongated brass tube 56, encased by a rubber or other insulation sleeve 57, and the upper end of tube 56 is screwthreaded into the lower end of coupling 54. This coupling 54 preferably has an upwardly facing chamfer 58 leading to an internal chamfer 59 at the upper end of torch tube 56. Fixed, as by silver soldering, inside the upper extremity of torch tube 56, is the upper end of a single flexible, coil spring, welding wire guide 60, which extends nearly to the lower end of the torch tube 56. The configuration of the chamfering, positioning of the upper end of the guide 60, and the applied silver solder, are preferably so arranged as to form a smooth "funnel" for the wires 19 to enter the guide 60, so that these wires will feed smoothly into the latter, without striking a shoulder on or around the upper end of the guide 60; but while this is a preferred feature, the two wires can initially be fed, with hand guidance, into the upper end of the guide 60, and if the wires are not thereafter retracted beyond the coupling 54, no problem will be encountered.

The base of a welding tip or nozzle 70 is screwed into a threaded socket 71 in the lower end of the torch tube 56, its end engaging the lower end of guide 60. This welding tip has a longitudinal passage 74 therethrough which may be capable at its entrance portion 75 of receiving both welding wires for a short distance, but which is then reduced or constricted, preferably gradually, as at 76, to a wire delivering orifice 78 capable of passing only one of the wires, and not both. Thus, in the present case, the entrance end portion of the passage through the tip has a convergent passage portion 75, whose large end can be large enough to receive both wires, but whose reduced end will pass only one of the wires. This reduction portion 75 leads to orifice 78 which is reduced to a size capable of passing only one of the wires. The reduction can, of course, be accomplished in various ways, and located at some higher point in the system. Preferably, the lower end of the coil spring guide 60 is tapered on the outside, as by grinding to the shape indicated at 80, and this tapered lower end can be seated within an internally chamfered entrance opening 81 at the inner end of the welding tip.

A feature of the invention is that the coupling 54 may be adjusted on the threaded upper end of the torch tube so that the lower end of the guide 60 just engages the seat 81, so as to avoid buckling of the guide 60, on the one hand, or a gap between the guide at its seat on the end of the welding tip, on the other.

A circuit for operation of the present two wire feeding system is indicated in FIG. 1. Assuming a series wound gear motor 10, with an armature 90 and field winding 91, a source of 110 volts, A.C., feeds power leads 93 and 94. A double pole double throw motor reversing switch is indicated at 96 and a double pole double throw air control and indicator lamp switch is indicated at 97. Lead 94 goes to variable resistor 95, which controls motor speed, then to one side of the armature, and from the other side of the armature to an outside terminal of switch 96. The corresponding outside terminal of the switch is connected to power lead 93. The center terminals of switch 96 are connected across field winding 91 and the remaining pair of outside terminals are cross connected to the two first mentioned outside terminals. It will be quite evident that the operation of switch 96 reverses the polarity of the field winding relative to the armature winding, and so reverse the direction of the motor. The motor will drive one or the other of the wire drive rollers depending upon which pressure roller is actuated to press against its corresponding drive roller.

Air under pressure goes to two solenoid controlled air valves 100 and 101, the outlets of which are connected to the air cylinders 28 of the two wire feeding devices. Energization of the solenoid 102 of either of these valves passes air under pressure to the interior of the corresponding air cylinder 28, where it acts through the plunger to press the pressure roller against the wire and drive roller, and thus inaugurates drive of the wire by the latter. It will be evident that either wire may thereby be advanced or retracted depending upon the position occupied by the motor reverse switch 96.

The air control solenoids 102 are connected at one side to the power lead 94, and at the other to opposite outside terminals of switch 97.

Pilot lights 104 are connected between power lead 94 (ground) and the two remaining outside terminals of switch 97. One or the other of these pilot lights will be illuminated depending upon the position of switch 97, and will thus indicate which solenoid is energized, and therefore which welding wire will be driven upon closure of motor switch 96.

Operation is as follows: The welding circuit is energized and closed by connecting power through cable 49 to conductive sleeve 46, and thence to the two coiled wire guides 38 inside the sleeve and in contact therewith. The welding wires contact the guides, and are thus energized. An arc is drawn from the protruding extremity of the selected wire 19 to the work W, laying down weld metal at w.

To feed a selected wire 19, the motor is set for operation in one direction or the other by throwing the switch 96 to the appropriate position, and the appropriate solenoid is energized, through closure of switch 97 in one position or the other. Switch 97 is closed first, determining which wire will be fed, but not yet energizing the circuit. The motor reverse switch is at this time in a center open position. To start the motor, and simultaneously energize the pre-selected solenoid, switch 96 is thrown. The motor armature 90 and field winding 91 are thereby energized, and the motor driven. The solenoid selected by switch 97 is energized by closure of switch 96 by a circuit formed from power lead 94 through the solenoid and the closed solenoid switch 97 to the motor switch, through the field winding, to power lead 93. The energized solenoid opens the corresponding air valve 100, feeding air to the corresponding air cylinder, and so accomplishing drive of the corresponding wire 19. Assume the switch 96 has been thrown in a direction to advance the wire and project it from the tip of the torch. When the wire protrudes sufficiently, motor switch 96 is opened. This instantly opens the solenoid circuit at the motor switch 96, and the feed of the wire ceases instantly, even though the motor may coast a little way before stopping.

To retract the protruding wire, the solenoid switch is left in its original position, and the motor switch closed by throwing it in the opposite direction. The wire is then retracted by reverse rotation of the motor and by again pressing the pressure roller for that wire against its drive roller.

The motor switch 96 is opened when the wire has been drawn upwardly above the aforementioned reduction in passage diameter, and normally, this means up within the torch tube, above the welding tip. To advance the other wire, the solenoid switch is then thrown the other way, and the motor switch closed in a direction to feed the other wire forwardly, as well as, of course, to activate the feed means for this other wire.

It will be understood that the present embodiment of the invention is illustrative only, and that many changes may be made without department from the scope of the invention or of its claims.

I claim:

1. Means in an electric arc welding system adapted for guiding and selectively alternately feeding either of two consumable welding wire, comprising:
    two welding wires;
    two guide conduits, one receiving and guiding each of said welding wires, said conduits each having a wire-ingoing and a wire-outgoing end, and a single guide conduit to receive both of said wires side-by-side, said single conduit having a wire-ingoing end coupled to the outgoing ends of both of the first mentioned conduits, and said single conduit having an opposite wire-outgoing end;
    a single wire ejection nozzle joined to said outgoing end of said single conduit;
    said conduits and nozzle affording two individual welding wire passageways merging with a single, common, welding wire passageway;
    a restriction in said common passageway preventing passage of more than one of said wires therepast at a time; and
    manually controllable means for selectively alternately feeding either of said welding wires into and retracting it from the ingoing end of its respective one of said first mentioned guide conduits.

2. The subject matter of claim 1, wherein said nozzle is formed with a bore having an entrance end large enough to pass said two wires side-by-side and said restriction therebeyond preventing passage and ejection of but one of said wires at a time.

3. The subject matter of claim 1, wherein:
    the guide conduits each comprise, beginning at the wire ingoing ends thereof, a flexible insulation sheath and a wire coil guide encased thereby;
    and said single conduit comprises a Y-fitting having two hollow arms joined to the opposite ends of said sheathed wire coil guides, and a hollow stem;
    an electrically conductive contactor tube joined at one end to said stem of said Y-fitting, and a pair of wire coil guides positioned side-by-side inside said conductive tube;
    a coupling on the far end of said conductive tube;
    a torch tube joined at one end by said coupling to said contactor tube, and a flexible wire coil guide inside said torch tube, said last mentioned wire coil guide being adapted to receive and pass said welding wires side-by-side, said coupling affording passage space for wires from said wire coil guides ahead of said coupling passage into the single wire coil guide inside said torch tube;
    said nozzle being on the opposite end of said torch tube, and said restriction being located between said coupling and the wire ejection end of said nozzle.

4. The subject matter of claim 3, wherein said nozzle is formed with a bore having an entrance end large enough to pass said two wires side-by-side and a reduction therebeyond forming said restriction preventing passage and ejection of but one of said wires at a time.

5. An apparatus for guiding and selectively feeding any one of a plurality of consumable welding wires, comprising:
    at least two welding wires and a source of supply therefor;
    a corresponding plurality of guide conduits, each conduit adapted to receive, at an ingoing end thereof, and to guide one of said plurality of welding wires from said source of supply, said conduits leading to a common junction;
    a third guide conduit having ingoing and outgoing ends, said ingoing end being located at said common junction and leading from said junction to said outgoing end of said third conduit,
    a single wire ejection nozzle leading from said outgoing end of said third conduit;
    a restriction located intermediate said common junction and the outlet to said nozzle capable of passing only one of said wires at a time, and
    manually controllable means for selectively feeding or retracting a welding wire into and out of respective guide conduits.

* * * * *